US007375642B2

(12) United States Patent
Siemens et al.

(10) Patent No.: US 7,375,642 B2
(45) Date of Patent: May 20, 2008

(54) METHOD AND DEVICE FOR IDENTIFYING AND LOCALIZING A FIRE

(75) Inventors: Andreas Siemens, Laatzen (DE); Claus-Peter Reinecke, Wedemark (DE)

(73) Assignee: Wagner Alarm- und Sicherungssysteme GmbH, Langenhagen (DE)

(*) Notice: Subject to any disclaimer, the term of this patent is extended or adjusted under 35 U.S.C. 154(b) by 164 days.

(21) Appl. No.: 10/572,539

(22) PCT Filed: Aug. 24, 2004

(86) PCT No.: PCT/EP2004/009450

§ 371 (c)(1), (2), (4) Date: Mar. 17, 2006

(87) PCT Pub. No.: WO2005/048207

PCT Pub. Date: May 26, 2005

(65) Prior Publication Data

US 2007/0008157 A1 Jan. 11, 2007

(51) Int. Cl.
*G08B 17/10* (2006.01)
*G01N 1/16* (2006.01)

(52) U.S. Cl. .................................... 340/628; 73/863.31

(58) Field of Classification Search ................ 340/628, 340/630, 577, 584, 524, 511; 73/863.31, 73/23.2; 169/60

See application file for complete search history.

(56) References Cited

U.S. PATENT DOCUMENTS 5,103,212 A 4/1992 Notarianni et al.
5,477,218 A * 12/1995 Manmoto et al. ........... 340/630
5,552,775 A 9/1996 Harley
5,755,250 A 5/1998 Cole
6,285,291 B1 * 9/2001 Knox et al. ................. 340/634
6,425,297 B1 7/2002 Sharp
6,940,402 B1 9/2005 Lewis et al.

(Continued)

FOREIGN PATENT DOCUMENTS

DE 1061627 7/1959

(Continued)

*Primary Examiner*—Jeffery Hofsass
*Assistant Examiner*—Sigmund Tang
(74) *Attorney, Agent, or Firm*—Orum & Roth LLC

(57) ABSTRACT

The invention relates to a method and a device for detecting and localizing sources of fire in one or more monitored areas ($R_1, \ldots, R_n$) utilizing a suction pipe system (3) connecting the plurality of monitored areas ($R_1, \ldots, R_n$) and which communicates with each individual monitored area ($R_1, \ldots, R_n$) by means of at least one suction opening (4), a suction device (5) for extracting air samples (6) representative of the room air of the individual monitored areas ($R_1, \ldots, R_n$) from the individual monitored areas ($R_1, \ldots, R_n$) by means of the suction pipe system (3) and the suction openings (4), and a sensor (7) for detecting at least one fire parameter in the air samples (6) extracted through the suction pipe system (3), whereby the inventive device comprises a blowing device (8) for blowing out the air samples (6) suctioned into the suction pipe system (3) when sensor (7) detects at least one fire parameter in the extracted air samples (6). The fire is localized by means of the transit time measurement of a re-extracted fire parameter.

21 Claims, 2 Drawing Sheets

U.S. PATENT DOCUMENTS

| | | | | |
|---|---|---|---|---|
| 6,985,081 | B2 * | 1/2006 | Wagner et al. | 340/628 |
| 7,286,050 | B2 * | 10/2007 | Faltesek | 340/524 |

FOREIGN PATENT DOCUMENTS

| | | | |
|---|---|---|---|
| DE | 3139582 | A1 | 4/1983 |
| DE | 3237021 | A1 | 5/1983 |
| DE | 4125739 | A1 | 2/1993 |
| FR | 2670010 | | 6/1992 |
| JP | 09-135919 | | 5/1997 |

* cited by examiner

METHOD AND DEVICE FOR IDENTIFYING AND LOCALIZING A FIRE

BACKGROUND OF THE INVENTION

1. Field of the Invention

The invention relates to a method for detecting and localizing a fire and/or the origin of a fire in one or more monitored areas as well as a device for realizing the method.

The invention starts out from a fire detecting device having a sensor for detecting a fire parameter which is fed a representative volume of room or device air through a suction pipe system by means of a suction device such as a fan.

2. Description of Related Art

The term “fire parameter” is to be understood as physical variables which are subject to measurable changes in the vicinity of an incipient fire, e.g. ambient temperature, solid or liquid or gaseous content in the ambient air (accumulation of smoke particles or particulate matter or accumulating smoke or gases) or local background radiation.

Both procedures as well as fire detecting devices of the cited type are known and serve for prompt detecting of fires still in their incipient phase. Typical areas of application are either rooms containing high-quality or important equipment such as, for example, rooms containing computer systems in banks or the like, or even just the computer equipment itself. To this end, representative samples of the room air or the device cooling air are continually extracted, referred to in the following as “air sample.” An appropriate means for extracting such air samples and feeding same to the fire sensor, to the housing of the fire sensor respectively, is a suction pipe system designed as a system of conduits which are mounted, for example, below the ceiling of the room and lead to air intake openings in the housing of the fire sensor and which sucks the air samples in through air suction openings provided in the suction pipe system. An important premise in detecting an incipient fire at its earliest stage is that the fire detecting device continually extracts a sufficiently representative amount of air without interruption to supply the sensor sensing chamber. An applicable sensor here would be, for example, a point-based smoke sensor which measures the light turbidity in a sensor smoke chamber caused by particulate matter, or also a scattered light sensor integrated in the intake path which detects scattered light caused by smoke particles at a center of the sensor.

Methods and devices using a plurality of suction pipe systems to detect and localize sources of fire in one or more monitored areas are known from the prior art and have been developed based on the fact that, for example, it is very difficult for firefighting crews to localize the source of a fire in large halls, office buildings, hotels or ships. One single smoke suction system having a single fire-detecting unit may—subject to national regulations—monitor an area of up to 2000 $m^2$, which may also comprise several rooms. In order to enable an operative alarm site to be quickly localized, requirements have been defined such as those set forth, for example, in Germany’s “Guidelines for Automatic Fire Reporting Installations, Planning and Construction” (VdS 2095). Pursuant thereto, a plurality of rooms may only be grouped together into one alarm area when the rooms are adjacent, the access to same can be readily seen at a glance, the total surface area does not exceed 1000 $m^2$, and there are clear visual alarm indicators at the fire alarm monitoring station which, in the event of a fire alarm, indicate the area where the fire is located.

While devices for detecting fire which operate on an aspirative principle, in which a plurality of areas to be monitored are connected by one individual smoke suction system, offer the advantage of the earliest possible detection of fire, there is no guarantee that the site of the fire can be localized in such a commonly-shared smoke suction system monitoring a plurality of areas. This is due to the fact that the individual air samples, each representing the room air from one individual monitored area, are fed to the sensor for detecting a fire parameter after having been mixed together in the jointly-shared suction pipe system. All the sensor can thus establish is that a fire broke out and/or is imminent in one of the areas being monitored. In order to be able to additionally ensure a localization of the seat of the fire in one of said monitored areas, it is usually necessary to feed each air sample extracted from each individual monitored area to another sensor of a separate suction pipe system in order to detect a fire parameter. Yet when monitoring a plurality of monitored areas, this has the disadvantage that the corresponding number of suction pipe systems must be in place, which involves a very complex implementation of the one or more aspirative fire detection system(s) both structurally as well as financially.

FR 2670010 Al discloses alarm boxes which serve to identify the smoke-sucking joint in a branched suction pipe system. These alarm boxes consist of a point-based smoke sensor built into a housing with a cable threading to connect the inlet and outlet pipes and a signal light on its cover. Yet disadvantageous to this construction is that because of their size, design and price, these alarm boxes cannot be employed at each individual air intake opening.

Known further from WO 00/68909 is a method and a device for detecting fires in monitored areas by means of which the source of a fire can be localized. This method utilizes an appropriate device in each monitored area comprised of two crossing pipes, into which one or more fans continually suck in air from the monitored areas through suction openings disposed in the pipes and feed same to at least one sensor for detecting one fire parameter per pipe. The localization of the seat of the fire thereby follows from the responding of the two sensors allocated to the crossing pipes. A plurality of areas is monitored by such pipes arranged as a matrix of columns and rows, where appropriate by one cumulative sensor each for the column and row arrangement. A disadvantage to this known device, however, is the very substantial installation outlay for the matrix-like system of pipes.

Known from the German DE 3 237 021 C2 patent specification is a selective gas/smoke detection system having a plurality of suction lines connected separately to various measuring points in an area to be monitored in order to withdraw samples of air or gas at said measuring points. Here, a gas or smoke sensor connected to these lines reacts to the presence of a specific gas in the sample upon a fixed threshold being exceeded and emits a detection signal which controls an indicator and/or alarm circuit. Shut-off valves which are cyclically and periodically energized in a controlled loop are furthermore arranged on the individual suction lines. Detecting fire with this gas/smoke detection system ensues in that in the absence of a detection signal, the control unit sets the shut-off valves such that all the suction lines are simultaneously in open connection with the sensor, and upon a detection signal being received, switches them over to a sensing mode in which the suction lines are conventionally brought into open connection with the sensor consecutively or in groups. This function for detecting the origin of fire presupposes, however, that the sensor can be brought into connection with each area to be monitored by way of individual and selectively-opened feed lines. This inherently means having to install an extensive system of pipes in order to create these individually selectable connections. Likewise disadvantageous is the high cost of installing the necessary suction lines.

WO 93/23736 further makes known an air pollution/smoke detection device based on a network-like configured suction system having a large number of sampling sites at which gas is extracted from each room to be monitored. This pollution/smoke detection device has a plurality of inlet ports connected to the grid-like suction system and monitored individually. Under normal circumstances, all these inlets remain open until the detection device detects pollution/smoke. Selectively closing the inlet ports then allows the localizing and detecting of a fire zone. But the operation of this detection device also requires an extensive installation of suction lines to form a grid-like structure in order to ensure reliable detection of a fire source. Here as well, the disadvantage to this known device lies in the high installation outlay for the system of pipes.

Further known from DE 101 25 687 Al is a device for detecting and localizing a source of fire in one or more monitored areas. The device comprises a main sensor for detecting a fire parameter with an intake unit continuously feeding samples of the ambient air from the monitored areas through a line disposed with intake ports arranged in each monitoring chamber. One sub-sensor each is thereby provided on or in the vicinity of at least one suction opening per monitored area, which is switched on by a switch-on signal transmitted by a controller in accordance with a detection signal emitted by the main sensor. The switched-on sub-sensor thereby serves in the detecting of the source of the fire and thus for localizing the fire source from the plurality of monitored areas. This device known from the prior art has the disadvantage that due to the number of sub-sensors employed, the costs associated with the fire detecting device are relatively high and furthermore necessitates a relatively complex wiring of the sub-sensors when installing the device.

SUMMARY OF THE INVENTION

One task addressed by the present invention is to provide a simple and economical device and a method for detecting sources of fire which combines the advantages of known smoke and gas suction systems—active intake and concealed mounting—with the advantage of localizing each individual suction opening and thus detecting an actual seat of fire or actual gaseous impurity as occurs when a fire develops. A further task addressed by the present invention consists of providing a fire-extinguishing system comprising an aspirative fire detection device which affords both reliable fire detection as well as localization of the site of a fire from a plurality of monitored areas, whereby the fire detection device can dispense with the need for a plurality of suction pipe systems connecting the individual monitored areas to one sensor in order to detect a fire parameter.

According to the invention, this task is solved by a method of the type described at the outset having the following procedural steps: air samples representative of each individual monitored area are extracted from said individual monitored areas—preferably continuously—through a common suction pipe system; at least one fire parameter is established for the air samples sucked in through the suction pipe system by the at least one sensor provided for detecting fire parameters; the suctioned air samples within the suction pipe system are blown out by means of a blower or suction/blower device; representative air samples of the room air from each of the individual monitored areas are re-extracted through the suction pipe system for as long as necessary until the at least one sensor re-detects a fire parameter in the air samples; the time elapsed before the re-detecting of the fire parameter in the previously re-extracted air samples is evaluated in order to localize an actual fire or the site of an imminent fire from one of the many monitored areas; and a signal is emitted which indicates the development and/or presence of a fire in one or more of the monitored areas, wherein the signal also contains further information for a precise localization of the fire in the one or more monitored areas.

The underlying technical problem of the present invention is further solved by a device comprising a suction pipe system connecting the plurality of areas to be monitored which communicates with each individual monitored area by means of at least one suction opening, a suction device to extract representative air samples from the individual monitored areas by means of the suction pipe system and the suction openings, and at least one sensor for detecting at least One fire parameter in the air samples extracted through the suction pipe system, whereby the device is characterized by a blowing device for blowing out the air samples sucked into the suction pipe system when the at least one sensor detects at least one fire parameter in the extracted air samples, and by at least one indicator element which identifies the site of a fire in one of the monitored areas and/or by a communication device which transmits information on the development and/or presence of a fire in one or more of the monitored areas and on the precise location of the fire in the one or more monitored areas to a location remote of the device.

The task of applying the technique is solved by utilizing a device in accordance with the invention as a fire detection component of a fire extinguishing system for activating the introduction of a fire extinguishing agent in one of the monitored areas.

An essential aspect of the present invention relates to the fact that based on the already widespread use of installations for smoke or gas suction systems—also known as aspirative monitoring systems—the only technical approach that makes sense is a simple and economical retrofitting to achieve individual detection of fire sources or gas impurities under the criteria of existing norms. At the same time, a situation where the associated retrofitting runs into substantial construction and operating costs in order to meet desired safety standards must be avoided. The particular advantages of the invention are seen in that not only are the requirements of detecting and localizing a fire and/or the onset of a fire in one of a plurality of monitored areas attainable following simple retrofitting of existing aspirative systems together with concurrent low operating costs utilizing a very easy to realize and thereby very effective method, but the inventive method's localizing of the site of a fire also opens up new applications for smoke suction systems. This thus dispenses with the need for, as an example, a plurality of point-based fire alarms as used to date in buildings having a plurality of individual rooms. The inventive method affords the reliable detection of a fire or the onset of a fire in a monitored area and for this monitored area to be localized from a plurality of monitored areas through the use of just one suction pipe system, one sensor to detect a fire parameter, and one suction/blowing device. Doing so does away with the need for an elaborate installation of a plurality of suction pipe systems in combination with a plurality of sensors, which clearly and advantageously reduces the structural complexity of the installation or the retrofitting of a plurality of monitoring areas with such a fire detection device. Because the fire detection and localization is aspiratively based, the present method is extremely sensitive and in particular independent of spatial heights or high air speeds within the individual monitored areas. High ceilings or higher air speeds lead, for example in air-conditioned areas, to a vigorous diluting of smoke. The high detection sensitivity of the inventive fire detection and localization method is to a large extent independent of these parameters. The inventive method moreover offers the advantage that a fire and/or the onset of a fire can be reliably identified and located independent of disturbances such as dust, dirt, humidity or extreme temperatures in the individual monitored areas. The method according to invention also makes possible the use of only one single suction pipe system which can be integrated virtually invisibly into the building's architecture so that aesthetic interests can be commensurately taken into full account.

Blowing out the air samples sucked into and present within the suction pipe system after the sensor for detecting fire parameters detects at least one fire parameter in the air sample sucked through the suction pipe system occasions fresh air to then fill the entire suction pipe system; i.e., air which definitely no longer exhibits any fire parameter. Following the air samples being blown out, the suction pipe system re-extracts air samples representative of the room air of each individual monitored area from the individual monitored areas. An essential aspect of the method according to the invention is now the measuring of the transit time and/or specific transit time values until the sensor once again detects a fire parameter in the air samples sucked through the commonly-shared suction pipe system. This transit time is subsequently evaluated in order to localize the site of the fire or the site where a fire is developing, based on the fact that each individual monitored area is at a certain distance from the sensor and also exhibits a transit time dependent on the suction pipe system.

In realizing the above-described method, the device according to the invention allows for providing a suction device to extract representative air samples of the room air within the individual monitored areas from each individual monitored area through the suction pipe system communicating with each individual monitored area via suction openings, and subsequently feed same to the sensor. Of course, to lower the probability of sensor failure, a plurality of sensors can also be used for detecting a fire parameter with the device according to the invention. It would also be conceivable to use one sensor for one specific fire parameter and another sensor for another fire parameter. The device in accordance with the invention is particularly advantageous in terms of maintenance and service. Utilizing only one sensor, one suction device and one blowing device, which can be arranged in a separate area external the monitored areas and thus readily accessible to maintenance personnel, not only clearly reduces overall maintenance costs, but also the maintenance and service personnel do not need to enter the monitored areas, which is a particularly important aspect in the case of cleanrooms, ship cabins or prison cells. In a particularly preferred embodiment, the device according to the invention additionally exhibits a communication device, by means of which information is transmitted to a site remote of the device regarding the emergence and/or presence of a fire in one or more of the monitored areas and regarding the precise location of the fire in the one or more monitored areas. A site remote of the device in this context can be for example a fire alarm monitoring station or a control center for task force crews. The communication device thereby enables for example either a wired or wireless transmission of a corresponding signal containing the relevant information in the event of a fire to an associated receiver. Said communication device can itself be controllable, of course, for instance in order to change or test an operational state of the device. IR technology would also be applicable as a conceivable communication medium.

Preferred embodiments of the invention related to the method are indicated in subclaims 2 to 9 and related to the device in subclaims 11 to 20.

For instance, it is particularly preferred in terms of the method for the flow rate of an air sample in the suction pipe system to be determined as the respective air samples are being withdrawn from the individual monitored areas. This flow rate then serves in calculating the time necessary to fully blow out the air samples located in the suction pipe system. The determination or measurement of the flow rate can thereby be done either directly or indirectly; i.e., for example based on device parameters such as the output of the suction device, the effective flow cross-section of the suction pipe system and the respective diameters to the suction openings disposed along the suction pipe system. A direct measurement is possible with a plurality of different flow rate-measuring methods known in the art. It would be conceivable here to make use of, for example, hot-wire or hot-film anemometry. Calculating the time necessary for the blowing device to fully blow the air samples out through the suction pipe system can advantageously realize a minimizing of the blow-out time and localizes the site of the fire in the shortest possible time.

A particularly advantageous realization of the inventive method provides for the process step of blowing out the extracted air samples present in the suction pipe system to further comprise the process step of determining the flow rate during this blowing out in order to calculate the time necessary to fully blow the air samples out of the suction pipe system. Here, note is made of the fact that sectioning and blowing out very probably take place at different flow rates, even if the same fan is used for both sectioning and blowing, since fans normally exhibit different characteristic curves for these two modes of operation. Based on the flow rate determined during the blowing out, the time which is necessary to fully blow all the air samples out of the suction pipe system is then calculated, whereby this calculated time is a very exact value.

It is furthermore particularly preferred to determine the flow rate of the air samples in the suction pipe system during the renewed extraction of the respective air samples from the individual monitored areas. The determined flow rate thereafter serves as the basis for calculating the transit time of the respective air samples representative of the room air of the individual monitored areas during the renewed extraction of the respective air samples from the individual monitored areas. This embodiment of the method achieves a particularly high reliability and accuracy to the localization of the site of the fire. Of course, transit time occurring with the renewed extraction of the respective air samples from the individual monitored areas can also be calculated on the basis of, for example, the flow rate determined during the continuous extraction of the respective air samples from the individual monitored areas or on the basis of theoretical values.

Air sampling according to the inventive method is realized by means of a suction device, whereby the subsequent re-extraction of air samples from the individual monitored areas ensues with a suction line which is reduced in comparison to the suction line used for the previously performed air sample extraction. In particularly preferred manner, this thus achieves a longer transit time for the re-suctioning and the difference in transit times between the different suction openings also increases. As a result, a more reliable correlating of measured transit time to specific monitored area is attained. Allowing for a transit time measurement tolerance of, for example, 0.5 to 2 seconds would be conceivable. In order to avoid,two neighboring suction openings overlapping in transit time tolerance ranges, which would result in localization of a fire no longer being possible, the re-extraction is therefore run at a lower suction line. Thus, this embodiment advantageously increases the accuracy of the transit time measurement. Yet it is, of course, also conceivable—additionally or in place of—to increase the sampling rate for the fire parameter in the sensor during re-suctioning, which likewise increases the accuracy of the transit time measurement.

A particularly preferred realization of the method according to the invention further provides for an auto-adjusting procedure, comprising the following process steps: a fire parameter is artificially produced at a suction opening at the most distant monitored area from the at least one sensor over the entire time of the auto-adjusting procedure; air samples are suctioned from the individual monitored areas through the commonly-shared suction pipe system until the at least one sensor detects the artificially-generated fire parameter in the extracted air samples; the extracted air samples located within the suction pipe system are blown out by means of a blowing or suctioning/blowing device; new air samples are again suctioned out of the individual monitored areas through the suction pipe system at least until the at least one sensor re-detects an artificially-generated fire parameter in the air samples; the transit time elapsed until the re-detection of the artificially-generated fire parameter of the re-extracted air samples is evaluated in order to determine the maximum transit time for the suction pipe system; the transit times for the respective air samples representative of the room air of the individual monitored areas are calculated based on the previously-determined maximum transit times and the configuration of the suction pipe system, in particular the distance between the suction openings, the diameter to the suction pipe system and the diameter of the suction openings; and the calculated transit times for the respective air samples are stored in a table. The advantage to this embodiment, using the auto-adjusting procedure, is particularly based on no longer needing to measure the flow rate of the air samples in the suction pipe system. In this regard, it is provided to put the fire detection device into operation in a self-learning mode, generate smoke at the most distant suction opening, and to measure the transit time with the process steps of suctioning, blowing out and re-suctioning. Based on the maximum transit time and the specific pipe configuration, the transit times for all suction openings can then be calculated. This calculation can be performed by the fire detection device itself or externally, for example on a laptop computer. The calculated fire detection device transit times are then subsequently stored to a table.

A particularly preferred embodiment of the method according to the invention making use of the auto-adjusting procedure further provides for utilizing a correcting function on the calculated transit times stored in the table in order to update the transit time values occurring for the individual monitored areas. Doing so takes into account that the suction pipe system and/or the suction openings may gradually get dirty over time, which would go hand in hand with a gradual change in the flow rate. A correcting function can thus be used to calculate current transit times from the transit times stored in the table.

Evaluating the transit times in the inventive method prior to the renewed detecting of fire parameters for the re-extracted air samples preferably ensues by comparing the resulting transit time with respective transit times computed theoretically for the individual monitored areas. Conceivable as applicable parameters on which the theoretically-calculated transit times can depend include the length of the respective sections of the suction pipe system between the sensor and the suction openings of the respective monitored areas, the effective flow cross-section of the suction pipe system and/or the respective sections of the suction pipe system between the sensor and the suction openings of the respective monitored areas, and the flow rate of the air samples in the suction pipe system and/or in the respective sections of the suction pipe system between the sensor and the suction openings of the respectively monitored areas. However, other parameters on which the theoretically-calculated transit time can depend are, of course, also conceivable.

One advantageous embodiment to the inventive device is provided by the device additionally exhibiting a controller to enable a time-coordinated controlling of the suction device and the blowing device in agreement with a signal emitted by the at least one sensor when the sensor detects at least one fire parameter in the air samples.

Said controller is preferably configured such that the suction device is first set to effect a continuous withdrawal of air samples representative of the room air from the individual monitored areas through the common suction pipe system. Should the sensor then detect at least one fire parameter in the extracted air samples, and thus send the corresponding signal to the controller, the controller sends a corresponding signal to the suction device in response thereto in order to shut off same, whereby at the same time or directly thereafter, a further signal is issued by the controller to the blowing device to switch on said blowing device in order to blow out the extracted air samples located within the suction pipe system. In accordance with the invention, it is thereby provided for the controller to send another signal to the blowing device after a fixed time in order to shut if off, whereby at the same time or directly thereafter, a signal issues from the controller to the suction device in order to effect a renewed continuous extraction of air samples representative of the room air of the individual monitored areas from the individual monitored areas through the suction pipe system. The fixed time during which the blowing device is active is either a time determined theoretically on the basis of device parameters and stored in a memory, or is a time determined by means of a measured flow rate value to an air sample in the suction pipe system during the continues extraction of the respective air samples from the individual monitored areas.

A particularly preferred embodiment of the inventive device further provides for a memory device in which transit time values can be stored. The values saved in this memory can be, for example, transit times determined during an auto-adjusting procedure based on a maximum transit time and the pipe configuration.

Particularly preferred is for the device according to invention to exhibit at least one smoke generator arranged near a suction opening and which can artificially generate a fire parameter for the purpose of setting and testing the fire detection device. It is thus possible when putting the fire detection device into operation to set it in a self-learning mode to measure the smoke generated by means of the smoke generator at the most distant suction opening and the transit time of the artificially-generated smoke, the artificially-generated fire parameter respectively. This thus enables the measuring of a maximum transit time, based on which and given knowledge of the pipe configuration, the transit times for all suction openings can be calculated. It is, of course, also conceivable here for the fire generator to be arranged at another suction opening, respectively a plurality of smoke generators provided at different suction openings.

In one possible realization, the device according to the invention further comprises a sensor for measuring the flow rate of the air samples in the suction pipe system. In so doing, it is advantageously possible to determine the flow rate of the extracted air samples in the suction pipe system, in order to calculate based on same the time necessary for the blowing device to completely blow out the air samples present in the suction pipe system. The flow rate determined with the help of the sensor can moreover serve in calculating the transit times of the respective air samples representative of the air room of the individual monitored areas during the re-extraction of the respective air samples from said individual monitored areas. Examples of sensors for measuring the flow rate are known in the prior art and include sensors based on the principle of hot film and/or hot wire anemometry. It would furthermore be conceivable to determine the flow rate based on theoretical device parameters instead of measuring the flow rate with a sensor. Likewise conceivable here would also be only switching on the sensor to measure the flow rate for the duration of one self-learning mode upon device start-up.

Particularly preferred is to provide a processor for evaluating a signal emitted by the at least one sensor when the sensor detects a fire parameter in an air sample and a control signal emitted by the controller to the suction device and/or blowing device. The processor is thereby advantageously configured such that it determines the transit time of the air sample representative of the respective room air of the individual monitored areas by the renewed continuous extraction from each individual monitored area through the suction pipe system based on the signal, in order to thus localize the site of the fire or the developing fire. Evaluating the resulting transit time is thereby performed in the processor by comparing the resultant transit time with respective transit times computed theoretically for the individual monitoring areas. The theoretically-computed transit times can be dependent on, for example, the length of the respective sections of the suction pipe system between the sensor and the respective monitored areas, the effective flow cross-section of the suction pipe system and/or the respective sections of the suction pipe system between the sensor and the respective monitored areas, and the flow rate to the air sample in the suction pipe system and/or in the respective sections of the suction pipe system between the sensor and the suction openings of the respective monitored area. By analyzing the transit times, localizing the site of the fire becomes possible.

An advantageous embodiment of the inventive device provides for the diameters and/or the cross-sectional shape to the individual suction openings to be configured contingent upon the respectively monitored areas.

Conceivable here in terms of the monitored areas which are disposed farther from the suction/blowing device would be to utilize suction openings with larger cross-sections than the monitored areas which are closer to the suction/blowing device. The respective distance of the monitored areas from the suction/blowing device is defined by the distance an air sample must traverse the suction pipe system from the respective suction opening in the respective monitored area to the suction device. The respective cross-sectional shape or cross-sectional size to the individual suction openings are designed in such a way that they take the drop in pressure occurring in the suction pipe system into account. The inventive embodiment to the suction openings thereby enables the inventive device to be equally sensitive in terms of fire detection and fire localization for each of the plurality of monitored areas. In one possible realization, the individual suction openings in the suction pipe system could be adapted to given conditions following installation of the pipe system in the building. It would be conceivable, for example, to initially configure all suction openings to be the same size, having the same cross-sectional shape respectively, whereby the respective suction openings are defined post-installation by affixing a corresponding diaphragm aperture to the suction openings. Applicable here would be, for example, a perforated film or perforated clip, whereby the hole size in the film or the clip is adapted to the given spatial circumstances. Of course other embodiments are just as conceivable. Also possible would be for the suction pipe system to be configured such that the cross-sectional shape to the suction pipe system will vary according to installation conditions.

A particularly advantageous realization provides for configuring the suction device and the blowing device together as one blower. Said blower is thus designed such that it changes the direction it conveys air in response to the control signal from the controller. This thus allows achieving a further reduction in the number of components comprising the inventive device, which in turn advantageously lowers the costs of manufacturing the device in accordance with the invention.

In order to further reduce the number of components comprising the fire detection and fire localization device according to invention, the suction device and the blowing device are advantageously configured together as one blower, whereby said blower is one affording reversal of rotation.

A further realization of the device according to invention in which the suction device and the blowing device are configured together as one blower provides for the blower to be a fan having the appropriate ventilation flaps so as to change the direction it conveys air. Other embodiments are of course also conceivable here.

As indicated above, the inventive device comprises indicator elements which identify the site of a fire in one of the monitored areas. These indicator elements can be in the proximity of the entrances to these areas or in the proximity of the fire detection device respectively. The communication means or one input component for the connection to a communication bus with a fire alarm central station serves to forward information on the site of a fire to the central station, in order to display it, for example, in plain text on the control panel (e.g. “fire in Area X”). Additionally to or in place of the indicator elements, the inventive device can further comprise a communication device which transmits information regarding the onset and/or presence of a fire in one or more of the monitored areas and regarding the precise location of the fire in the one or more monitored areas to a site remote of the device, such as, for example, to a fire alarm central station or a control center for task force crews. Depending upon application, the communication device thereby preferably affords either the wired or wireless possibility of emitting an appropriate signal to at least one associated receiver disposed at a distance from the inventive device when the need arises. Said communication device can, of course, also itself be externally controllable, for instance in order to change or test an operational state of the device. IR technology would also be applicable as a conceivable communication medium.

BRIEF DESCRIPTION OF THE FIGURES

The following will make reference to the drawings in describing a preferred embodiment of the inventive device in greater detail.

Shown are.

DETAILED DESCRIPTION OF THE INVENTION

Figure 1:
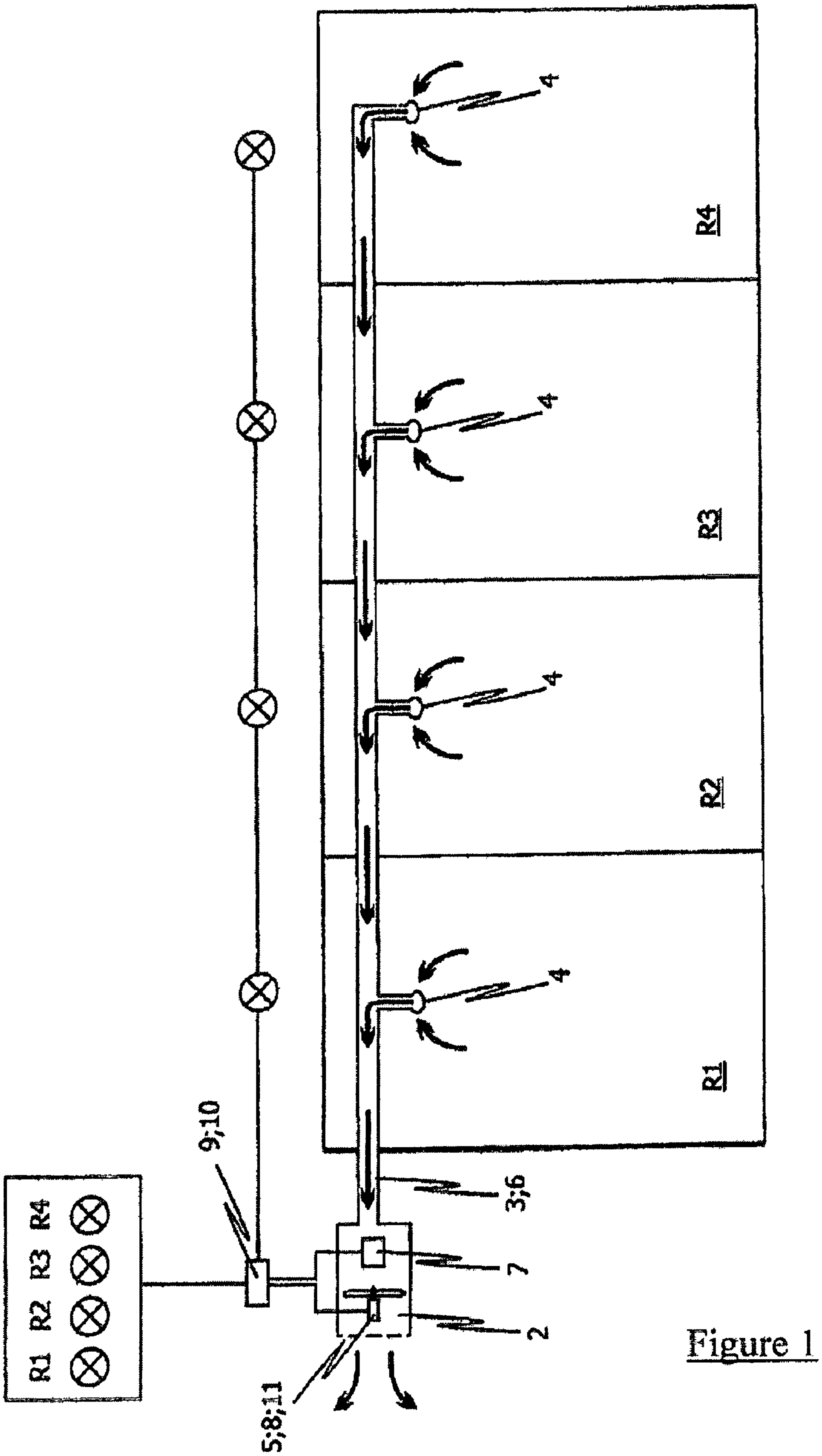
FIG. 1 a schematic representation of an embodiment of the inventive device for detecting a fire and localizing the fire in one monitored area out of a plurality of monitored areas.

FIG. 1 is a schematic representation of a preferred embodiment of the inventive device for detecting a fire and for localizing the fire within one monitored area ($R_1$, $R_2$, . . . , $R_n$) from a plurality of monitored areas ($R_1$, $R_2$, . . . , $R_n$). The inventive device according to FIG. 1 involves a centrally-arranged, aspirating fire detection device able to precisely localize the site of a fire. In the embodiment as depicted, the device is used to monitor four separate monitored areas ($R_1$, $R_2$, $R_3$, $R_4$). It is hereby provided for each one air sample (6), representative of the room air of the respective monitored areas ($R_1$, . . . , $R_4$) to be continuously extracted from the respective monitored areas ($R_1$, . . . , $R_4$) through a common suction pipe system (3). To this end, a suction device (5) configured as a blower is provided at one end of the suction pipe system (3). The air samples (6) extracted through the common suction pipe system (3) by the suction device (5) are conveyed to a sensor or a plurality of sensors (7) to detect one or more fire parameters. It would be conceivable in this regard to arrange the suction device (5) together with the sensor (7) in one common housing (2).

Sensor (7) serves to analyze the air samples (6), each representative of the room air of the monitored areas ($R_1$, . . . , $R_4$) to be monitored, as suctioned through the suction pipe system (3) for a fire parameter. Applicable as sensor (7) would be any of the devices known in the prior art. In the event of a fire breaking out in one of monitored areas ($R_1$, . . . , $R_4$) or the room air of a monitored area ($R_1$, . . . , $R_4$) containing fire parameters and sensor (7) detects said fire parameters in the extracted air samples (6), same emits the corresponding signal to a controller (9).

In response to this signal, controller (9) emits the appropriate control signal to suction device (5) so as to switch it off. At the same time or immediately thereafter, a further signal is emitted by controller (9) to a blowing device to activate same. Said blowing device (8) is advantageously arranged such that when in operation, it blows out the air samples (6) already extracted and still present in the suction pipe system (3). In particularly advantageous fashion in the embodiment as depicted, the suction device (5) and the blowing device (8) are configured together as one blower (11) which changes its air-conveying direction in response to a signal emitted by controller (9). As an example, the blower could be a reversing-rotation fan, yet also conceivable would be a blower (11) having a fan with ventilation flaps. When blowing out the suction pipe system, blowing device (8) brings in fresh air, i.e. outside air, toward the individual suction openings (4) of the respective monitored areas ($R_1$, . . . , R4). Said fresh air thereby displaces the air samples (6) still within the suction pipe system (3) which are, for example, blown back out into monitored areas ($R_1$, . . . , $R_4$) through the respective suction openings (4).

In accordance with the invention, controller (9) is designed such that it sends a further signal to blowing device (8) after all the air samples (6) are blown out of the suction pipe system (3) in order to switch same off. At the same time or immediately thereafter, controller (9) reactivates suction device (5). By so doing, air samples (6) representative of the room air of the individual monitored areas ($R_1$, . . . , $R_4$) are re-extracted from the individual monitored areas ($R_1$, . . . , $R_4$) through the suction pipe system (3) and conveyed to sensor (7). Said sensor (7) detects the presence of fire parameters in the extracted air samples (6) after a specific period of time following the restart of suction device (5). The time elapsing between the renewed starting of suction device (5) and the initial detecting of fire parameters in the re-extracted air sample (6) defines the so-called transit time, which serves as the basis for localizing the seat of the fire.

A processor (10) is provided to evaluate the transit time determined as such which compares the transit time determined with transit times calculated theoretically. The theoretically-calculated transit times stand in direct correlation to the distance of sensor (7) from suction openings (4) of the individual monitored areas ($R_1$, . . . , R4), since they depend on at least one of the following parameters: length of the suction pipe system (3) between sensor (7) and the suction openings (4) of the respective monitored areas ($R_1$, . . . , $R_4$); the effective flow cross-section of the suction pipe system (3) between sensor (7) and the suction openings (4) of the respective monitored areas ($R_1$, . . . , R4); and the flow rate to the air sample (6) within suction pipe system (3). Thus, with knowledge of at least the length of the respective sections of the suction pipe system (3) between sensor (7) and the suction openings (4) of the respective monitored areas ($R_1$. . . , $R_4$) and the flow rate of the air samples (6) through suction pipe system (3), it is possible-to localize the site of the fire based on the transit time as measured.

The preferred embodiment of the present invention further comprises a sensor (12) to measure the flow rate of the air samples (6) in the suction pipe system (3). The measured flow rates are used by processor (10) to evaluate the measured transit times. It is however also possible to forgo a sensor (12) for measuring flow rate, whereby the flow rate is determined on the basis of device parameters such as, for example, the effective flow cross-section of the suction pipe system (3), suction capacity of the suction device (5), cross-sectional shape and cross-section opening to the suction openings (4).

It is also possible for the fire detection device to determine a transit time in a self-learning mode and calculate all respective transit times from same, storing them in a memory-saved table.

Figures 2A, 2B:
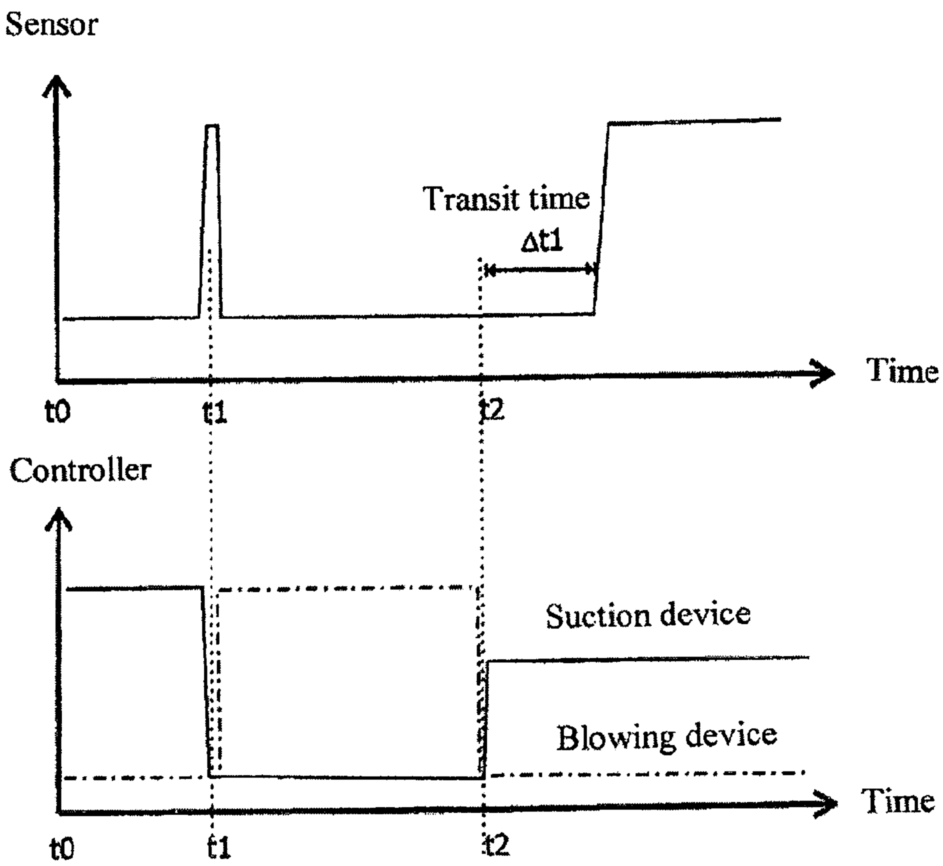
FIG. 2*a, b* graphic representations of the signal dynamics.

FIGS. 2*a* and 2*b* each show a graphic representation schematically depicting the signal emitted by sensor (7) or controller (9) for controlling suction device (5) and blowing device (8). The x-axis here represents the time while the y-axis represents the signal of sensor (7) or the control signal of controller (10). In the $t_0$ to $t_1$ time interval, suction device. (5) is controlled by controller (10) so as to be continually active; i.e., extracting air samples (6) from the monitored areas ($R_1$, . . . , R4). A dotted line is used to depict this process in FIG. 2*b*. At time point $t_1$, sensor (7) detects the occurrence of a fire parameter in the extracted air samples (6). In response to the signal emitted by sensor (7) at time point $t_1$, suction device (5) is switched off and blowing device (8) simultaneously activated. The blowing-out period corresponds to the period from $t_1$ to $t_2$, which is a time dependent upon the output of blowing device (8) and on specific parameters of the suction pipe system (3).

After all the air samples (6) within suction pipe system (3) are blown out at time $t_2$, controller (9) deactivates blowing device (8) and simultaneously re-activates suction device (5). Sensor (7) is then again fed air samples (6) accordingly. Decisive for localizing the site of the fire is now the transit time $\Delta t_1$ to $\Delta t_4$. Transit time ($\Delta t_1, \ldots \Delta t_4$) corresponds to the period of time from time point $t_2$, at which suction device (5) is re-activated, to time point $t_3$ to $t_6$, at which sensor (7) again detects a fire parameter in the extracted air samples (6). Said transit times ($\Delta t_1 \ldots \Delta t_4$) are specific to the individual monitored areas ($R_1, \ldots, R_4$) and serve the subsequent analysis of localizing the site of the fire.

The invention claimed is:

1. Method for detecting and localizing a fire and/or the origin of a fire in one or more monitored areas comprising the following process steps:

a) extracting air samples in each case representative of the room air of the respective individual monitored areas from said individual monitored areas through a common suction pipe system;

b) detecting at least one fire parameter in the air samples suctioned through suction pipe system with at least one sensor for detecting fire parameters;

c) blowing out the extracted air samples within suction pipe system by means of a blower or suctioning/blower device;

d) re-extracting air samples from the individual monitored areas through suction pipe system at least until the at least one sensor re-detects a fire parameter in air samples;

e) evaluating the time elapsed before the re-detecting of the fire parameter in the re-extracted air samples from process step d) in order to localize a fire or the site of an imminent fire in one of the plurality of monitored areas; and f) emitting a signal indicating the development and/or presence of a fire in one or more of monitored areas, wherein the signal contains further information for a precise localization of the fire in said one or more monitored areas.

2. Method as claimed in claim 1, further comprising the following process steps subsequent to process step a):

a1) determining the flow rate to air samples in suction pipe system during the continuous extraction of respective air samples from individual monitored areas; and a2) calculating the time necessary to fully blow out air samples located in suction pipe system.

3. Method as claimed in claim 1, wherein process step c) comprises the process step of determining the flow rate during said blowing out in order to calculate the time necessary to fully blow out the air samples located within suction pipe system.

4. Method as claimed in claim 1, further comprising the following process steps subsequent to process step d):

d1) determining the flow rate to air samples in suction pipe system during the renewed extraction of respective air samples from individual monitored areas; and d2) calculating the transit time of respective air samples representative of the room air of the individual monitored areas during the renewed extraction of respective air samples from individual monitored areas.

5. Method as claimed in claim 1, wherein the air sampling performed in process steps a) and d) is realized by means of a suction device, wherein the subsequent re-extraction of air samples performed in process step d) ensues with a suction line which is reduced in comparison to the suction line used in process step a).

6. Method as claimed in claim 1 further including an auto-adjusting procedure comprising the following process steps:

i) artificially producing a fire parameter at suction opening at the most distant monitored area from the at least one sensor over the entire time of the auto-adjusting procedure;

ii) suctioning air samples from individual monitored areas through common suction pipe system until the at least one sensor detects the artificially-generated fire parameter in extracted air samples;

iii) blowing out extracted air samples located in suction pipe system by means of a blowing or suctioning/blowing device;

iv) renewed extraction of air samples from individual monitored areas through suction pipe system at least until sensor redetects an artificially-generated fire parameter in air samples;

v) evaluating the transit time elapsed until the re-detection of the artificially-generated fire parameter in the re-extracted air samples performed in process step iv) in order to determine the maximum transit time for the suction pipe system;

vi) calculating the transit times for respective air samples representative of the room air of individual monitored areas from individual monitored areas based on the maximum transit times determined in process step v) and the configuration of suction pipe system, in particular the distance between suction openings, the diameter to the suction pipe system and the diameter to suction openings; and vii) storing the calculated transit times for respective air samples in a table.

7. Method as claimed in claim 6, wherein the auto-adjusting procedure according to process step vii) further comprises the following process step:

viii) utilizing a correcting function on the calculated transit times stored in the table in order to update the transit time values occurring for the individual monitored areas.

8. Method as claimed in claim 6, wherein the analysis of the transit time occurring in the event of a fire is made by comparing the occurring transit time with the respectively calculated transit times saved to the table in the auto-adjusting procedure.

9. Method as claimed in claim 1, wherein the analysis of the transit time occurring is made by comparing the occurring transit time with the respective transit times calculated theoretically for individual monitored areas in dependence on at least one of the following parameters: the length of the respective sections of the suction pipe system between the at least one sensor and the suction openings of the respectively monitored areas disposed in suction pipe system; the effective flow cross-section of suction pipe system and/or the respective sections of suction pipe system between the at least one sensor and the respective monitored areas; and the flow rate of the air samples in suction pipe system and/or in the respective sections of suction pipe system between the at least one sensor and the suction openings of the respective monitored areas.

10. Fire detection device for detecting and localizing a fire and/or the origin of a fire in one or more monitored areas comprising a suction pipe system connecting said monitored areas which communicates with each individual monitored area by means of at least one suction opening, a suction device for extracting representative air samples from individual monitored areas by means of suction pipe system and suction openings, and at least one sensor for detecting at least one fire parameter in the air samples suctioned through suction pipe system, characterized by a blowing device for blowing out the air samples sucked into suction pipe system when the at least one sensor detects at least one fire parameter in said extracted air samples, and by at least one indicator element which identifies the site of a fire in one of monitored areas and/or by a communication device which transmits information on the development and/or presence of a fire in one or more of said monitored areas and on the precise location of the fire in said one or more monitored areas to a location remote of the device.

11. Device as claimed in claim 10, further comprising a controller for a time-coordinated controlling of suction device and blowing device in agreement with a signal emitted by the at least one sensor when said at least one sensor detects at least one fire parameter in air samples.

12. Device in as claimed in claim 10, further comprising a memory means for storing the transit time values.

13. Device as claimed in claim 10, further comprising at least one smoke generator arranged near a suction opening and artificially generating a fire parameter for setting and testing the fire detection device.

14. Device as claimed in claim 10, further comprising at least one sensor for measuring the flow rate of air samples in the suction pipe system.

15. Device in as claimed in claim 10, further comprising a processor for evaluating a signal emitted by sensor when said at least one sensor detects a fire parameter in an air sample and a control signal emitted by controller to suction device and/or blowing device.

16. Device as claimed in claim 10, wherein the diameters and/or the cross-sectional shape to individual suction openings is configured contingent upon respective monitored areas.

17. Device as claimed in claim 10, wherein the diameters and/or the cross-sectional shape to the individual sections of suction pipe system between the at least one sensor and the respective monitored areas is configured contingent upon the respective monitored areas.

18. Device as claimed in claim 10, wherein the suction device and the blowing device are configured together as one blower which changes the direction it conveys air in response to a control signal from controller.

19. Device as claimed in claim 18, wherein the blower is a reversing-rotation fan.

20. Device as claimed in claim 18, wherein the blower is a fan having ventilation flaps.

21. Application of the device as claimed in claim 10 as a fire detection component of a fire extinguishing system for activating the introduction of a fire extinguishing agent in one of monitored areas.

* * * * *